United States Patent

Tirkkonen

Patent Number: 5,520,940
Date of Patent: May 28, 1996

[54] BAG FOR CURING FOOD

[76] Inventor: Tapani Tirkkonen, SF-73620 Kortteinen, Finland

[21] Appl. No.: 84,949

[22] Filed: Jul. 2, 1993

[30] Foreign Application Priority Data

Oct. 19, 1992 [FI] Finland ............................... 920621 U

[51] Int. Cl.$^6$ ............................ A23B 4/048; A23B 4/044
[52] U.S. Cl. ......................... 426/132; 99/482; 426/113; 426/314; 426/316; 426/325; 426/412
[58] Field of Search ................................ 426/113, 124, 426/112, 415, 316, 315, 314, 132, 133, 325, 412; 44/520–522, 530, 541; 99/482

[56] References Cited

U.S. PATENT DOCUMENTS

| | | | |
|---|---|---|---|
| 1,190,010 | 7/1916 | Reubold | 426/523 |
| 2,357,258 | 8/1944 | Harris | 426/316 |
| 2,423,964 | 7/1947 | Coffman | 426/315 |
| 2,528,233 | 10/1950 | Kubricht | 426/132 |
| 2,759,830 | 8/1956 | Touceda | 426/415 |
| 2,902,371 | 9/1959 | Shorr | 426/113 |
| 2,967,023 | 1/1961 | Huckabee | 44/520 |
| 3,042,532 | 7/1962 | Daline | 426/132 |
| 3,135,614 | 6/1964 | Parisi et al. | 426/113 |
| 3,322,319 | 5/1967 | Sweeney et al. | 426/113 |
| 3,323,442 | 6/1967 | Rader | 426/113 |
| 3,347,148 | 10/1967 | Williams . | |
| 3,385,282 | 5/1968 | Lloyd | 44/522 |
| 3,454,377 | 7/1969 | Renwick | 426/314 |
| 3,603,454 | 9/1971 | Raaf | 426/316 |
| 3,651,596 | 3/1972 | Orsing | 426/314 |
| 3,689,291 | 9/1972 | Draper | 426/124 |
| 3,881,023 | 4/1975 | Wilson | 426/132 |
| 4,299,851 | 11/1981 | Lowe | 426/113 |
| 4,390,554 | 6/1983 | Levinson | 426/124 |
| 4,596,713 | 6/1986 | Burdette . | |
| 4,724,756 | 2/1988 | Sarparanta | 99/482 |
| 4,762,056 | 8/1988 | Virag | 426/523 |
| 4,779,525 | 10/1988 | Gaines | 99/482 |
| 4,963,374 | 10/1990 | Brandel et al. | 426/112 |
| 5,206,044 | 4/1993 | Walton | 426/113 |

FOREIGN PATENT DOCUMENTS

| | | |
|---|---|---|
| 0250385 | 12/1987 | European Pat. Off. . |
| 300809 | 1/1989 | European Pat. Off. . |
| 6703740 | 2/1975 | Sweden . |
| 13374 | of 1909 | United Kingdom .................. 426/113 |
| 1206047 | 9/1970 | United Kingdom .................. 426/415 |

OTHER PUBLICATIONS

Sustrelle Laboratory Manual Jun. 2 1975 3 pages.

*Primary Examiner*—Steven Weinstein
*Attorney, Agent, or Firm*—Cushman, Darby & Cushman

[57] ABSTRACT

The present invention concerns a bag for curing food, said bag being made from a heat-resistant, foldable material. Conventionally, simultaneous flavoring and curing of food is awkward. The interior of the bag (1) according to the invention contains material releasing flavoring gas, whereby desired flavoring of food curing inside the bag is attained.

3 Claims, 1 Drawing Sheet

BAG FOR CURING FOOD

The present invention relates to a bag for curing food, said bag been made from a heat-resistant foldable material.

To heat sausages and other meat products, so-called roasting bags are used by placing them on a glowing bed of coals or in a fireplace. Such bags are only employed for heating food.

Fish and meat are smoke-cured in a variety of smoking units, smoking boxes, containers and such. Such accessories provide a closeable space incorporating a grate or similar support on which the fish or meat to be smoke-cured is placed. To generate a smoke-filled atmosphere, small chips of appropriate wood are placed on the bottom of the smoking space, where they smoulder and thus provide a desirable flavor and look to the meat or fish. Smoking boxes and similar appliances are relatively expensive, heavy and large in size. Their transport from one place to another is difficult. For example, on fishing trips one can never be certain of catching anything, and therefore, carrying smoking appliances around is clumsy, so they are usually left behind.

Food is generally flavored by marinating in a spiced solution or through spreading or sprinkling spice(s) on their surface. Marinating is time-consuming, and sprinkling of the spice fails to spread the spice evenly.

It is an object of the invention to provide a bag for curing food, said bag being capable of overcoming the drawbacks of conventional methods and appliances. In particular, it is an object of the invention to achieve a bag suited to give food a desired flavor and provide fast and efficient smoke-curing of food. It is a further object of the invention to provide a bag of cost-efficient production, simple structure, light weight, foldability into small size and ease-of-use.

The goal of the invention is achieved by providing a bag made from a heat-resistant, foldable material and in which a material capable of releasing a flavoring gas is disposed. In a preferred embodiment, an intermediate wall is mounted to the bag wall and the gas-releasing material is placed in the space between the intermediate wall and the bag wall.

The bag according to the invention is prefilled with a material suited to impart the desired flavor. The bag material may be any prior-art heat-resistant material suited for making bags such as a metal foil or paper or similar material coated with a metal film. As the material is thin, the bag is light and cost-efficient to produce. The bag is foldable, permitting storage in small space and easy transportation. The material which is placed into the bag to release the flavoring gas is a suitable material which generates a non-toxic gas. As the food is placed into the bag and the bag is heated, also the material contained in the bag is heated. The gas released from the material is mixed into the atmosphere surrounding the food and absorbed into the food. Simultaneously, the inherent taste of the food is preserved. Through proper choice of the material inserted in the bag, the inherent taste of the food can even be enhanced, or alternatively, affected in a desired manner. The bag is suited for producing various kinds of foods.

In a preferred application of the invention, one or more intermediate walls are placed to the interior of the bag, and the gas-generating material is placed between said intermediate wall and the bag outer wall. The intermediate wall is made of a suitable material having such holes that permit the penetration of the gas via the holes into the actual bag space containing the fish or meat or other food stuff. Adherence of the food to the intermediate wall is prevented, yet permitting fat released by the food to flow through the holes into the intermediate space.

In another preferred embodiment of the invention, at least one inner wall of the bag has the gas-generating material attached. Such a material can be, e.g., a thin slice of wood veneer or other suitable material. Such a slice of material can be attached to one ore more inner walls of the smoke-curing bag. The size of the slices can be varied appropriately according to the application. For instance, one wall can have several slices spaced by a small distance from each other, whereby the bag can be easily folded at the spaces between the slices. This approach provides a bag which folds into a small volume for transportation and storage.

In another embodiment of the invention, wood material is placed to the interior of the bag, whereby the bag operates as a smoke-curing bag. For this purpose, several different wood materials can be appropriately employed. The wood material can be contained in the bag in crushed, chipped, sliced or other form. In another preferred embodiment, different kinds of flavor or color imparting materials or spices or the like materials are placed into the bag for generating the gas. Moreover, both wood materials and flavor imparting materials and/or spices can be placed into the bag.

BRIEF DESCRIPTION OF THE DRAWINGS

In the following, the invention is explained in greater detail with reference to the annexed drawing, in which.

Figure 1:
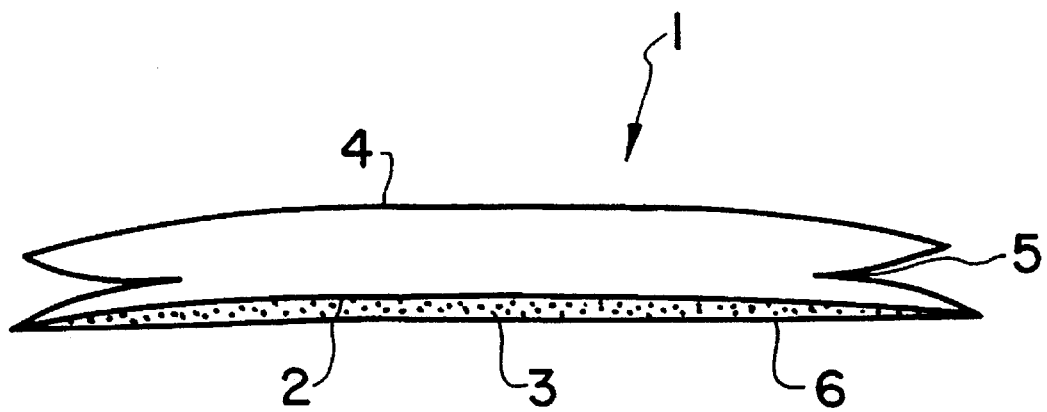
FIG. 1 shows an embodiment of the bag according to the invention in a cross-sectional side view when folded flat.
Figure 2:
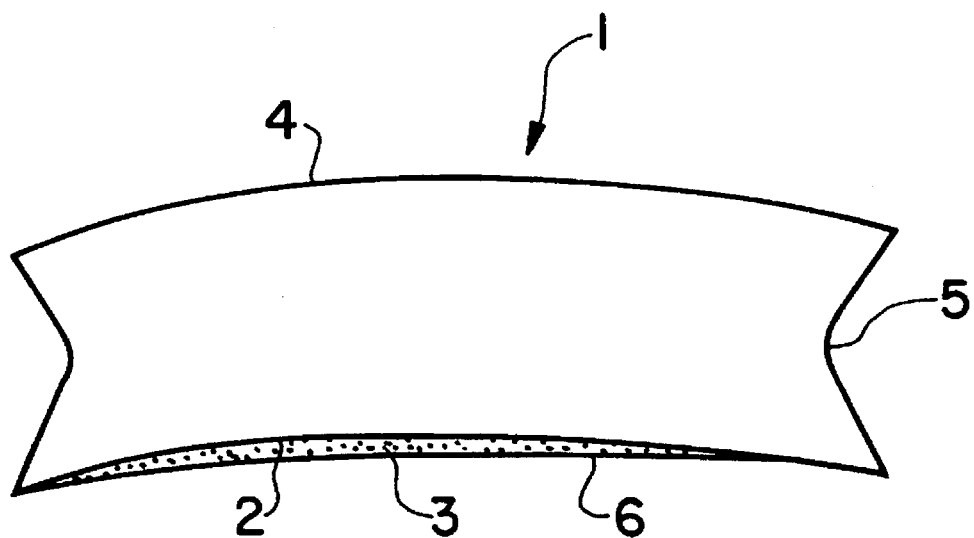
FIG. 2 shows the bag illustrated in FIG. 1 in a cross-sectional side view when opened for use.

According to the diagrams, the bag is a bag 1 made from a foil or similar material. The bag is sealed at its edges by a heat-resistant sealing method. In the diagrams the upper part 4 is provided with folded sides 5. The fold is sealed at its lower edges to the lower part 6 of the bag. The lower part 6 has attached to it an intermediate bottom 2 acting as the intermediate wall, and placed to the space 3 remaining between the intermediate bottom and the wall of the lower part, an amount of wood material, advantageously crushed alder for instance, and sugar. The intermediate bottom is made of the same material as the bag proper, however, punched to have a plurality of holes. In some embodiments the bag can be made of a different material, since the intermediate bottom need not tolerate as high temperatures as the material of the bag proper.

When folded (FIG. 1), the bag acts as a conventional bag by being foldable into a small and easy-to-carry size. For use, the mouth of the bag is opened and its interior is shaped with hand for desired size by unfolding the folds. Fish or meat to be cured for food is inserted over the intermediate bottom, the mouth of the bag is closed tightly by, e.g., rolling the mouth of the bag, and the bag is placed over open fire, smoldering fire or any other source of heat, or to the vicinity thereof. At the heating of the bag, with resultant curing of the fish or meat, the wood material is rapidly charred and the smoke released enters the bag interior proper containing the fish or meat via the holes in the intermediate bottom.

After smoke-curing, the meat or fish is prepared for serving by, e.g., opening the bag from above using scissors or a knife, for instance, and unfolding the cut edges to the sides. Thus, the meat or fish is attractively displayed on the intermediate bottom, ready to eat.

The above-described preferred embodiment must not be understood to limit the applications of the invention, but rather, it can be varied within the scope of the annexed claims.

I claim:

1. A bag for curing food having walls made from a heat-resistant, flexible, foldable material, said walls including a bottom wall and side walls, said walls defining therebetween a substantially closed food curing compartment for receiving a food to be cured and being of a size to define a gas circulating gap between the food to be cured received there within and at least some of said walls;

an intermediate wall mounted to said bottom wall so that the food to be cured will be disposed on the intermediate wall, a material receiving space being defined between said intermediate wall and said bottom wall, said intermediate wall being apertured to allow gas released from said material to pass into said gas circulating gap; and a material for releasing a flavoring gas disposed in said space, said material comprising a wood material.

2. A bag as in claim 1, wherein said material comprises a spice.

3. A bag as in claim 1, wherein said walls are formed from an aluminum material.

* * * * *